(12) United States Patent
Granite et al.

(10) Patent No.: US 7,776,780 B1
(45) Date of Patent: Aug. 17, 2010

(54) CATALYSTS FOR OXIDATION OF MERCURY IN FLUE GAS

(75) Inventors: Evan J. Granite, Wexford, PA (US); Henry W. Pennline, Bethel Park, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1405 days.

(21) Appl. No.: 11/183,221

(22) Filed: Jul. 14, 2005

(51) Int. Cl.
  *B01J 27/18* (2006.01)
  *B01J 27/06* (2006.01)
  *B01D 53/02* (2006.01)
(52) U.S. Cl. .................. 502/181; 95/134; 95/901
(58) Field of Classification Search .............. 502/66, 502/73, 74, 87, 185, 261, 326, 327, 332, 502/334, 339, 349, 350, 351, 355, 415, 439, 502/181; 95/134, 901
See application file for complete search history.

(56) References Cited

U.S. PATENT DOCUMENTS

| | | | | |
|---|---|---|---|---|
| 3,719,739 A | * | 3/1973 | Thompson | 423/213.5 |
| 3,822,220 A | * | 7/1974 | Veltman | 502/5 |
| 4,918,042 A | * | 4/1990 | Takada et al. | 502/314 |
| 5,208,203 A | * | 5/1993 | Horiuchi et al. | 502/302 |
| 5,208,206 A | * | 5/1993 | Yasaki et al. | 502/334 |
| 5,580,535 A | * | 12/1996 | Hoke et al. | 423/245.3 |
| 5,911,961 A | * | 6/1999 | Horiuchi et al. | 423/213.5 |
| 6,162,558 A | * | 12/2000 | Borup et al. | 429/19 |
| 6,521,021 B1 | * | 2/2003 | Pennline et al. | 95/134 |
| 6,676,919 B1 | * | 1/2004 | Fischer et al. | 423/584 |
| 6,783,585 B2 | * | 8/2004 | Zacarias et al. | 106/405 |
| 6,875,408 B1 | * | 4/2005 | Yamamoto et al. | 422/180 |
| 7,033,419 B1 | * | 4/2006 | Granite et al. | 95/134 |
| 7,056,359 B1 | * | 6/2006 | Somerville et al. | 44/604 |
| 7,410,626 B2 | * | 8/2008 | Tran et al. | 423/351 |
| 2006/0210463 A1 | * | 9/2006 | Comrie | 423/215.5 |

* cited by examiner

*Primary Examiner*—Cam N Nguyen
(74) *Attorney, Agent, or Firm*—Mark C. Lang; Bradley L. Smith

(57) ABSTRACT

Two new classes of catalysts for the removal of heavy metal contaminants, especially mercury (Hg) from effluent gases. Both of these classes of catalysts are excellent absorbers of HCl and $Cl_2$ present in effluent gases. This adsorption of oxidizing agents aids in the oxidation of heavy metal contaminants. The catalysts remove mercury by oxidizing the Hg into mercury (II) moieties. For one class of catalysts, the active component is selected from the group consisting of iridium (Ir) and iridum-platinum (Ir/Pt) alloys. The Ir and Ir/Pt alloy catalysts are especially corrosion resistant. For the other class of catalyst, the active component is partially combusted coal or "Thief" carbon impregnated with $Cl_2$. Untreated Thief carbon catalyst can be self-activating in the presence of effluent gas streams. The Thief carbon catalyst is disposable by means of capture from the effluent gas stream in a particulate collection device (PCD).

3 Claims, No Drawings

CATALYSTS FOR OXIDATION OF MERCURY IN FLUE GAS

CONTRACTUAL ORIGIN OF THE INVENTION

The United States Government has rights in this invention pursuant to the employer-employee relationship between the Government and the inventors who are U.S. Department of Energy employees at the National Energy Technology Laboratory, Pittsburgh, Pa.

BACKGROUND OF THE INVENTION

1. Field of the Invention

This invention relates to catalysts for the oxidation and removal of heavy metals from effluent gases, and more specifically, this invention relates to metal catalysts and partially combusted coal as catalysts for the removal of heavy metals such as mercury (Hg) from high temperature gases generated from sources such as coal gasifiers, coal-fired electrical generating plants, ore smelters, oil- or petroleum resid-fired combustors, and various waste incinerators.

2. Background of the Invention

Certain effluent gas streams contain many toxic pollutants, including the heavy metals mercury and cadmium. Coal-burning power plants, incinerators, oil-burning boilers and power plants, refuse-derived fuel power plants, and gasification systems (especially integrated gasification combined cycle power generation systems) are sources of effluent streams with mercury and other heavy metals. The combustion of low-rank coals such as Powder River Basin sub-bituminous coal and lignites have been shown to form flue gases where the mercury is primarily in the elemental form.

Mercuric or mercury (II) chloride, $HgCl_2$, is highly soluble in water, and is more readily removed by carbon sorbents. Therefore, agents that can oxidize elemental mercury to mercury (II) chloride (or another oxidized mercury compound) would be of considerable value in effluent clean-up. Such agents would enable mercury to be captured by existing air pollution control devices (APCDs) present at coal-burning power plants. Typical APCDs include wet scrubbers for acid gas removal ($SO_x$ and $NO_x$), as well as electrostatic precipitators (ESPs) and baghouse filters for particulate removal.

Ideally, the mercury oxidation catalysts would be located upstream of the appropriate APCD. Mercury (II) chloride is readily removed by the scrubbing solutions employed for acid gas removal and/or by adsorption on unburned carbon in fly ash captured by ESPs or baghouse filters. Mercury (II) chloride is also sequestered by activated carbon sorbents injected upstream of an ESP or baghouse.

Much of the mercury contained in power plant flue gas is in the elemental form. Elemental mercury is a semi-noble metal, insoluble in water, and is not efficiently captured by carbon. As such, elemental mercury is difficult to capture; oxidized mercury is more amenable to capture.

Many technologies are being developed for the control of mercury emissions from flue gases. These methods employ sorbents, catalysts, scrubbing liquors, flue gas or coal additives, combustion modifications, barrier discharges, and ultraviolet (UV) radiation. Efforts have been made to develop catalysts for selectively oxidizing elemental mercury in effluent streams. However, selective catalytic reduction (SCR) catalysts, whose primary role in flue gas is the reduction of nitrogen oxides, achieve only 50 percent oxidation levels for mercury oxidation. SCR catalysts have not yet been optimized for mercury oxidation and removal.

Due to its relative simplicity and proven successful application for the incinerator market, most of the research has focused upon the use of activated carbon sorbents for the adsorption of mercury.

Gold (Au) and palladium (Pd) catalysts are used as mercury oxidation catalysts. However, both Au and Pd catalysts are not inert and therefore degrade in flue gases.

Thief carbons and their adsorption capabilities are described in U.S. Pat. No. 6,521,021 awarded to Pennline et al., on Feb. 18, 2003.

U.S. Pat. No. 6,136,281 awarded to Meischen, et al. on Oct. 24, 2000 discloses a gold catalyst for the oxidation of elemental Hg in effluent gas streams. The presence of $Cl_2$ and HCl in the effluent gas streams aids in the oxidation of elemental Hg.

None of the aforementioned patents discloses catalysts with both high mercury adsorption levels, high adsorption levels for HCl and $Cl_2$, and with superior anti-corrosion characteristics. In addition, none of the aforementioned patents disclose catalysts which are self-activating and disposable.

A need exists in the art for catalysts with both high mercury adsorption levels and high adsorption levels for HCl and $Cl_2$. The catalysts should exhibit superior anti-corrosion characteristics. Furthermore, the catalysts should be self-activating and disposable.

SUMMARY OF THE INVENTION

It is an object of the present invention to provide a mercury removal catalyst for flue gases that overcomes many of the disadvantages of the prior art.

Another object of the present invention is to provide a mercury oxidation catalyst which is more corrosion- and temperature-resistant than the catalysts currently available. A feature of the invention is the use of iridium and iridium-platinum catalysts and Thief carbon catalysts for the oxidation of mercury. An advantage of the invention is a longer useful life for the catalyst(s) which leads to lower long-term costs.

Still another object of the present invention is to provide a carbon-based catalyst with superior mercury adsorption properties. A feature of part of this invention is that partially combusted coal is used. An advantage of this feature is that the partially combusted coal is easily impregnated with HCl and $Cl_2$. The HCl and $Cl_2$ aids in the oxidation of Hg to Hg(II). Another advantage is that partially combusted coal is much less expensive than activated carbon, resulting in lower costs. Still another advantage is that the Thief carbon catalyst is readily disposable.

Yet another object of the present invention is to provide a mercury oxidation catalyst which is more readily regenerable. A feature of the invention is that iridium and iridium-platinum alloys are used. An advantage of this feature is that the solubility of mercury in these metals is more limited. Thus, less energy is needed to drive mercury out of the metals, also resulting in lower costs.

Still another object of the present invention is to provide a mercury oxidation catalyst that is disposable. A feature of this invention is that the source of the thief carbon is abundant to the point that regeneration of the catalyst is not essential. An advantage of this feature is considerable savings, in particular energy costs due to the elimination of the need to regenerate the catalyst.

Yet another object of the present invention is to provide mercury oxidation catalysts that are easily activated. A feature of this invention is that both classes of catalysts herein, metal and thief carbon can be activated via treatment with halogens such as chlorine and hydrochloric acid. An advantage of this feature is the use of metal catalysts that are easily regenerated, resulting in additional cost savings.

Still another object of the present invention is to provide a carbon-based mercury oxidation catalyst that is self-activating. A feature of this invention is that the catalyst is Thief carbon which is a superior adsorbent of halogens. The adsorption of halogens present in the effluent gas stream enables previously untreated Thief carbon to be an oxidizer of heavy metals such as Cd and Hg. An advantage of this feature is ease of use of the catalyst and thus more cost savings due to the removal of activation steps.

Briefly, the invention provides an adsorbing catalyst for the oxidation of heavy metals in effluent gas streams. Specifically, a material or substrate for removing elemental metal from an effluent stream is provided, the substrate comprising a means for adsorbing halogen from the effluent stream; and a means for contacting the elemental metal to the halogen for a time sufficient to oxidize the metal.

In addition, the invention provides a self-activating carbon catalyst for the oxidation of heavy metals in effluent gas streams.

Also provided is a method for removing elemental metal from effluent, the method comprising supplying a surface containing adsorbed halogen; and contacting the effluent to the surface for a time sufficient for the halogen to oxidize the elemental metal with the halogen.

DESCRIPTION OF INVENTION

The inventors have developed sorbents as catalysts for the removal of heavy metal contaminants from effluent gases. The heavy metals include, but are not limited to, elemental mercury and cadmium. The same sorbents are also good sorbents for HCl and $Cl_2$ present in effluent gases. This adsorption of halogen-base oxidizing agents present in the flue gas aids in the oxidation of mercury. Both classes of catalysts are readily regenerable.

The invented catalysts have a high oxidation capability for the heavy metal contaminants. For example, the catalysts remove cadmium and mercury by oxidizing the Cd and Hg into cadmium (II) and mercury (II) moieties, respectively.

For one class of catalysts, the active component is selected from the group consisting of iridium and iridium-platinum alloys.

For the other class of catalyst, the active component is partially combusted coal or "Thief" Carbon. These Thief Carbons adsorb HCl and chlorine present in flue gas, thereby serving as a reaction moiety feedstock and reaction surface for the oxidation of entrained elemental Hg. As such, the chlorine moieties serve as a means for activating the Thief Carbons. The activated Thief Carbons then are enabled to oxidize many heavy metals entrained in the effluent, such metals as Hg. The low cost of Thief carbons make them an attractive oxidation catalyst candidate for Hg in flue gas.

Both classes of catalysts can be formed into a solid phase selected from the group of extrudates, powders, pellets, or monoliths to accommodate various reactor configurations, including fluidized bed reactors. Alternatively, the catalysts can also be deployed on support substrate such as wire mesh or screen configurations. An exemplary constituent of the such configurations is stainless steel, discussed, infra.

The two classes of catalysts can also be employed within continuous emission conversion systems (CEM). CEM monitors for mercury often utilize methods to oxidize all of the mercury present within a slipstream of flue gas in order to facilitate the capture and detection of mercury.

Metal Catalyst Detail

Iridium and iridium-platinum catalysts are provided for the oxidation of mercury. These metal catalysts are more corrosion resistant than current metal catalysts for the oxidation of mercury.

Iridium (Ir) is a precious metal with remarkable resistance to corrosion. Iridium is employed in spark plug electrodes due to this corrosion resistance. Iridium-platinum (Ir/Pt) alloys are even more corrosion resistant, and are used in thermocouple wire and lab ware. Iridium and platinum are excellent adsorbers of hydrogen chloride (HCl) and chlorine ($Cl_2$). This adsorption capability of these two metals facilitates the oxidation of elemental mercury.

Iridium and iridium-platinum alloys are employed in a low concentration on a high surface area monolith or in a packed bed upstream of a wet scrubber, ESP, or baghouse to facilitate the capture of Hg in a coal-burning power plant. The high resistance to corrosion enable these potential catalysts to possess long useful lifetimes (longer than the similar lifetimes for Au and Pd) as well as to facilitate easy regeneration by acid washing or thermal treatment. These potential catalysts have superior adsorption capabilities for Cd, Hg, HCl and $Cl_2$.

Ir and Ir/Pt alloys comprise the active metal component of the solid metal catalysts, and are contained on a support material. The support material is a high temperature tolerant material selected from a group consisting of activated carbon, alumina ($Al_2O_3$), aluminosilicates, silica ($SiO_2$), titania ($TiO_2$), zirconia ($ZrO_2$), zeolite and combinations thereof.

The metal catalysts can be evenly deposited upon a support material using a variety of deposition methods, including, but are not limited to, application of paints, inks and pastes containing the metal sorbent, chemical vapor deposition (CVD), electrodeposition, extrusion, incipient wetness, and solution wash. Incipient wetness is similar to a wash method. Solution wash comprises placing the metal catalyst into a solution, soaking the support in the solution for a period of time with subsequent calcination or heating.

Deposition of active metal on the support materials described supra can be carried out in a controlled atmosphere selected from the group consisting of argon (Ar) nitrogen ($N_2$), helium (He), air, and a combination thereof.

Generally, the surface area of suitable solid metal catalysts ranges from between approximately 1 square meter per gram ($m^2/g$) to 1500 $m^2/g$. One method for determining the surface area of suitable metal catalysts is through the B.E.T. protocol, as established by Brunauer, Emmett and Teller, and disclosed in S. Brunauer et al., "Adsorption of Gases in Multimolecular Layers", *J. Am. Chem. Soc.*, 60(2), pages 309-319, (1938), and incorporated herein by reference. Higher surface areas (>30 $m^2/g$) are preferable in order to maximize the number of collisions between the metal catalyst and the heavy metal to be oxidized.

The metal catalysts can be used in the temperature range from about 20° C. (68° F.) to 427° C. (800° F.). The preferred temperature range for the Ir and Ir/Pt catalysts is from of about 38° C. (100° F.) to 399° C. (750° F.). The ratio of active component in the metal catalysts to support material ranges from of about 0.1 weight percent (wt. %) to 100 wt. % (essentially pure metal). The composition of the Ir/Pt alloy used can range from about 99.9 wt. percent Ir/0.1 wt. percent Pt to 0.1 wt. percent Ir/99.9 wt. percent Pt. A preferred range is of from about 10 wt. percent Ir/90 wt. percent Pt to 5 wt. percent Ir/95 wt. percent Pt.

As with Thief Carbon catalysts, discussed supra, iridium catalysts are "self-activating" in that they are excellent adsorbers of halogens (such as HCl and $Cl_2$) present within flue gas. Also, these metal-based catalysts can be deposited, dispersed or otherwise supported on stainless steel to facilitate a synergistic effect between oxidizing moieties found on the steel and the catalyst metals.

Thief Carbon Catalyst Detail

Surprisingly and unexpectedly, the inventors found that partially-combusted coal, known as Thief carbon is another suitable reaction catalyst for removal of elemental metal from flue gas, via the oxidation of elemental mercury present within flue gas. Generally; these carbons contain between 20 and 80 percent ash by weight.

Thief carbons are produced when coal is withdrawn from a furnace after a brief residence time (approximately 0.1 to 2.5 seconds) near the burner flame. Suitable Thief carbons are those coal remnants containing carbon in concentrations between those found in raw coal and fly ash (completely combusted coal). Preferable ash composition of partially combusted coal (i.e. thief carbon substrate) is from of about 20 wt. percent ash to 80 wt. percent ash.

Untreated Thief carbons or HCl-treated Thief carbons are employed in a packed bed, monolith, or introduced via injection into the ductor upstream of a wet scrubber, ESP, or baghouse in order to facilitate the capture of Hg in coal burning power plants.

Untreated Thief carbons have BET surface areas of from about 30 $m^2/g$ to 250 $m^2/g$. Typical particle sizes have diameters which range from of about 35 micrometers ($\mu m$) to 45 $\mu m$. The Thief carbon, or partially combusted coal, is withdrawn from the furnace, near the flame, after a brief residence time on the order of one second. Thief carbons are inexpensive, with an estimated cost of $90 to $250 per ton.

The Thief carbon is subsequently treated with halogen. Treatment can be done in one of two ways. The first is by gas-phase contact of the Thief carbon with halogens such as chlorine gas ($Cl_2(g)$), bromine liquid $Br_{2(liq)}$, bromine vapor ($Br_{2\;(gas)}$) and combinations thereof. Further, the carbon could be treated simultaneously with both chlorine and bromine. This could be accomplished by a combination of the elements, halogen-containing acids, or via the liquid or gaseous compound bromine chloride (BrCl). The second manner of treatment is by treatment with halogen-containing acids such as hydrochloric acid (HCl(aq)) or hydrobromic acid (HBr(aq)).

Treatment with halogen-containing acids is preferred. The HCl(aq) treatment entails boiling the thief carbon in concentrated aqueous HCl (37 wt. percent) to dryness. This gives the Thief carbon catalyst an expected halogen concentration ($Cl_2/Br_2$) of about 1 wt. percent to 10 wt. percent.

Preferred surface areas of treated Thief carbon catalysts range from of about 10 $m^2/g$ to 300 $m^2/g$.

Alternatively, Thief carbons can be used as catalysts without halogen treatment. Instead, the carbons are activated via exposure to the pollution stream inasmuch as effluent gas streams typically contain HCl and $Cl_2$. The Thief carbon adsorbs these halogen compounds due to its high surface area and relatively large pore volumes. Hence, the Thief carbon catalysts are self-activating carbon catalysts in effluent gas streams entrained with halogens. First, the Thief carbon is treated with effluent gas for a time sufficient to adsorb halogen to form a an activated carbon surface. Second, the activated carbon surface is contacted with the effluent gas for a time sufficient to oxidize the elemental metals contained therein. Third, the now-contacted carbon surface is regenerated via removal of the oxidized metal moieties.

The Thief carbon catalyst can be used in the temperature range of from about 20° C. (68° F.) to 427° C. (800° F.). As with the Ir and Ir/Pt catalysts, the preferred temperature range for the Thief Carbon catalyst is from about 38° C. (100° F.) to 399° C. (750° F.).

For both classes of catalysts, the most desirable operating temperature range is from about 60° C. (140° F.) to 205° C. (400° F.). This temperature range is that typically encountered upstream of air pollution control devices such as an ESP, baghouse filter, or wet scrubber present within coal-burning power plants.

The inventors have also found that both classes of catalysts are readily regenerable. Both classes of catalyst can be readily reactivated by application of heat and/or acid. The one-step activation is simple and inexpensive, allowing for considerable cost savings. Metal catalysts lose activity over time due to adsorption of poisons present with the flue gas. These poisons include sulfur, arsenic, and selenium. The invented catalysts are regenerated in an inert atmosphere, such as heating under vacuum, under nitrogen atmosphere, under argon atmosphere, or in an inexpensive oxidizing gas such as air. The metal catalysts are heated to above 500 C for a time sufficient for the mercury and surface poisons to desorb from the catalyst.

Concomitant with, or subsequent to the metals desorbing from the catalyst, the metals are removed from the catalytic process by their collection in solutions for subsequent use or disposal. For example, the off-gas from heat treatment of the used catalyst contains mercury. This mercury is collected either through absorption into a solution, or adsorption onto a sorbent.

Another method for restoring the activity of the used catalyst is by washing it with acid (either dilute or concentrated) at ambient or near ambient temperatures. Such acids include, but are not limited to nitric acid, hydrochloric acid, aqua regia, sulfuric acid, and combinations thereof.

The catalyst also may loose effectiveness due to physical build-up of fly ash particles, whereby the particles block reactive/adsorption sites on the surface of the catalyst. Mechanical removal of the fly ash will restore catalyst activity, said mechanical removal effected via actual tapping, ultrasound treatment, or contact of the catalyst with a high velocity, reverse flow gas stream. In the last instance, the high velocity clean-out stream is directed at the catalyst in a direction opposite to the direction the effluent stream flowed upon impingement with the catalyst.

The Thief carbon catalysts are readily disposable. Spent Thief catalysts can be removed from the flue gas by the plant's particulate collection device (PCD) or by the installation of a dedicated particulate collection device for the catalyst. The Thief carbon catalyst typically is of powder-like consistency, with a mean particle diameter of between approximately 30 and 45 microns.

EXAMPLE 1

A one percent (1%) by weight iridium catalyst supported on alumina beads (two (2) grams (g) total of Ir and $Al_2O_3$ beads with 20 milligrams (mg) of that being iridium) was examined using a bench-scale packed bed reactor. The reactor was a 10 inch (in) long by ½ in outer diameter quartz tube.

For illustration purposes only, data is presented here from experiments performed using particulate-free slipstreams of real flue gases from the U.S. DOE pilot-scale facility. Specifically, a 7.5 liter per minute (l/m) slipstream of particulate-free flue gas was generated by the National Energy Technology Laboratory (NETL) 500 pound per hour (lb/hr) pilot-scale combustion facility and was fed through the packed bed reactor at a constant temperature of 280° F. (138° C.). As such, the following approximate concentrations were utilized: carbon dioxide ($CO_2$) (<16 mole (mol) percent and more specifically approximately 12 mole percent), oxygen ($O_2$) (approximately 8 mol percent), sulfur dioxide ($SO_2$) (<2000 parts per million (ppm), and specifically 300 ppm), and nitric oxide (NO) (<500 ppm, and specifically <than 400 ppm) and carbon monoxide (CO) at between 1-10 ppm. The slip also contained moisture concentrations of approximately 8 mole percent. The inlet concentration of total gaseous Hg (elemental plus oxidized mercury) was 12.0 micrograms per normal cubic meter ($\mu g/m^3$), with the concentration of elemental Hg being 9.7 $\mu g/m^3$. After the system had been in operation 2.5 hrs, approximately 75 percent of the elemental Hg passing through had been oxidized. A Sir Galahad continuous emission monitor (CEM) (Orpington, Kent, United Kingdom) was used to monitor Hg emissions.

Surprisingly and unexpectedly, the inventors found that the iridium catalysts can be used without halogen pretreatment. Also, iridium catalysts oxidation activity of heavy metal increases as it adsorbs halogen from the feedstream.

EXAMPLE 2

A packed bed of 100 mg of HCl-treated high surface area (HSA) (220 $m^2/g$) Thief carbon was examined at 280° F. using the same reactor system as in Example 1 supra. A 7.5 liter per minute (l/m) slipstream of particulate-free flue gas generated by the National Energy Technology Laboratory (NETL) 500 pound per hour (lb/hr) pilot-scale combustion facility was fed through the packed bed reactor at a constant temperature of 280° F. (138° C.). The inlet concentration of total gaseous Hg (elemental plus oxidized mercury) was 10.0 micrograms per normal cubic meter ($\mu g/m^3$), with the concentration of elemental Hg being 8.0 $\mu g/m^3$. After the system had been in operation 6.0 hrs, approximately 75 percent of the elemental Hg passing through was being oxidized as determined by the same Sir Galahad CEM supra.

Thief carbon catalysts can be used without any inert material support, especially when the size of the catalyst or the pressure drop across the catalyst is a concern. Pure metal or alloy gauzes, meshes and wools are employed to eliminate the support, minimize the total mass of catalyst otherwise required, and minimize pressure drop across the catalyst monolith. For example, ferric chloride and ferric sulfate, both moieties found on the surfaces of stainless steel, are excellent sorbents for the removal of mercury from flue gas. Stainless steel surfaces catalyze the oxidation of elemental mercury present in flue gases, stainless steel wools, mesh, gauzes, flakes, filters, wires, or a combination of these configurations render suitable catalytic reaction surfaces, and suitable foundation support for the aforementioned Thief carbon sorbents/catalysts.

The reaction between elemental mercury and ferric chloride can be written as follows:

$$2Hg + 2FeCl_3 \rightarrow 2FeCl_2 + Hg_2Cl_2 \quad (1)$$

Elemental mercury reacts with ferric chloride to form mercurous chloride (calomel) and ferrous chloride. Reaction (1) proceeds rapidly in aqueous solution at room temperature.

Ferric sulfate reacts with elemental mercury to form ferrous sulfate and mercurous sulfate, viz:

$$2Hg + Fe_2(SO_4)_3 \rightarrow 2FeSO_4 + Hg_2SO_4 \quad (2)$$

Reaction (2) proceeds rapidly in aqueous solution at room temperature.

The aforementioned reaction sequences show that the oxidation of elemental mercury by ferric chloride or ferric sulfate are useful in the sorbent capture or catalytic oxidation in flue or fuel gas streams. Thus, reactions (1) and (2) form the basis for the sorbent capture of mercury in flue or fuel gas. After extended exposure, the sequestered mercurous chloride and mercurous sulfate are liberated as mercuric chloride, viz:

$$Hg_2Cl_2 + 2HCl + \tfrac{1}{2}O_2 \rightarrow 2HgCl_2 + H_2O \quad (3)$$

$$Hg_2SO_4 + 4HCl \rightarrow 2HgCl_2 + SO_2 + 2H_2O \quad (4)$$

Reactions (3) and (4) depict the mechanism of mercury oxidation on the surface of iron catalysts.

Iron levels in fly ash are correlated with increased levels of oxidized mercury in flue gas (EERC). The walls of stainless steel tubing and vessels promote the oxidation of mercury within coal-derived flue gases in as much as the surface of these stainless steels contain both iron chlorides and sulfates.

The chlorides and sulfates found on stainless steel surfaces not only directly oxidize elemental mercury, but also provide additional halogen feedstock to Thief carbon sorbents which are supported by stainless steel.

Stainless steel supports also are utilized for iridium and iridium alloy catalysts.

While the invention has been described with reference to details of the illustrated embodiments, these details are not intended to limit the scope of the invention as defined in the appended claims.

The embodiment of the invention in which an exclusive property or privilege is claimed is defined as follows:

1. A method for preparing a catalyst for the oxidation of mercury in an effluent stream comprising:
   a. removing partially combusted coal from a coal fired combustion source, wherein the partially combusted coal contains between approximately 20 wt. % and 80 wt. % ash and has a surface area of approximately 10 $m^2/g$ to 300 $m^2/g$;
   b. treating the partially combusted coal with a halogen to obtain a catalyst for the oxidation of mercury, wherein the catalyst has a final halogen concentration of about 1 wt. % to 10 wt. %, and wherein the treatment involves contacting the partially combusted coal with a gas phase containing chlorine gas, bromine liquid, bromine vapor or combinations thereof, or treating the partially combusted coal with hydrochloric or hydrobromic acid or combination thereof.

2. The method according to claim 1 wherein the partially combusted coal has a surface area of approximately 220 $m^2/g$.

3. The method according to claim 1 further comprising the step of placing the catalyst for the oxidation of mercury on a stainless steel support.

* * * * *